(12) United States Patent
Kawada et al.

(10) Patent No.: US 6,373,217 B1
(45) Date of Patent: Apr. 16, 2002

(54) CONTROL APPARATUS OF ELECTRIC POWER STEERING SYSTEM

(75) Inventors: Hideaki Kawada; Shuji Endo; Toru Sakaguchi, all of Maebashi (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/606,987

(22) Filed: Jun. 29, 2000

(30) Foreign Application Priority Data

Jul. 2, 1999 (JP) .......................................... 11-188940

(51) Int. Cl.$^7$ ................................................ B62D 5/04
(52) U.S. Cl. ...................... 318/564; 318/432; 318/459; 180/443
(58) Field of Search ................................ 318/430–434, 318/563, 564, 565, 566, 459, 500; 388/907.5; 180/443, 446

(56) References Cited

U.S. PATENT DOCUMENTS

| | | | |
|---|---|---|---|
| 5,201,818 A | * 4/1993 | Nishimoto ................. | 180/79.1 |
| 5,271,474 A | * 12/1993 | Nishimoto et al. ......... | 180/79.1 |
| 5,360,077 A | * 11/1994 | Nishimoto et al. ........ | 180/79.1 |
| 5,504,679 A | 4/1996 | Wada et al. ............. | 180/79.1 X |
| 5,563,790 A | * 10/1996 | Wada et al. ............. | 180/446 X |
| 5,602,735 A | * 2/1997 | Wada ..................... | 180/446 X |
| 5,878,360 A | * 3/1999 | Nishino et al. ............... | 701/41 |
| 6,026,926 A | * 2/2000 | Noro et al. .................. | 180/446 |

FOREIGN PATENT DOCUMENTS

| EP | 0 554 703 A1 | 8/1993 | ............ B62D/5/04 |
|---|---|---|---|
| GB | 2 204 006 A | 11/1988 | ............ B62D/6/00 |
| GB | 2 259 892 A | 3/1993 | ............ B62D/6/04 |
| JP | 5-112251 | 5/1993 | ............ B62D/6/02 |
| JP | 5-213208 | 8/1993 | ............ B62D/5/04 |
| JP | 6-239261 | 8/1994 | ............ B62D/6/02 |

* cited by examiner

*Primary Examiner*—Bentsu Ro
(74) *Attorney, Agent, or Firm*—Sughrue Mion, PLLC

(57) ABSTRACT

There have been cases wherein the program itself does not operate normally and only continues to output the monitoring pulse so that racing cannot be detected, or due to electromagnetic waves or noise a pulse signal being outputted normally is measured erroneously and a mis-detection is made. In a control apparatus of an electric power steering system for, on the basis of a current command value computed from a current detected value of a motor and a steering assist command value computed on the basis of a steering torque arising in a steering shaft, controlling the motor, which applies a steering assist force to a steering mechanism, a control apparatus of an electric power steering system characterized in that it comprises a first control part and a second control part each inputting at least a torque signal, a vehicle speed signal, the motor current detected value and a motor terminal voltage, and the motor is controlled with the first control part and the second control part.

7 Claims, 9 Drawing Sheets

CONTROL APPARATUS OF ELECTRIC POWER STEERING SYSTEM

BACKGROUND OF THE INVENTION

1. Field of the Invention

The present invention relates to a control apparatus of an electric power steering system for applying a steering assist force by means of a motor to a steering system of a car or a vehicle, and particularly to a control apparatus of an electric power steering system with improved control characteristics and safety having two control parts (CPUs or MCUs: Micro Controller Units), a main and a sub, and carrying out motor control with one and monitoring for abnormality of the drive system with the other.

2. Description of the Prior Art

An electric power steering system for urging with an assisting load a steering system of a car or a vehicle using rotational force of a motor applies as an assisting load to a steering shaft or a rack shaft a driving force of the motor by means of a transmission mechanism such as gears or a belt by way of a speed-changer. This electric power steering system of prior art, to generate an assist torque (steering assist torque) correctly, performs feedback control of a motor current. The feedback control regulates a motor impressed voltage so that the difference between a current command value and a motor current detected value decreases, and regulation of the motor impressed voltage is generally carried out by regulation of a duty ratio of PWM (Pulse Width Modulation) control.

Here, showing in FIG. 1 and explaining a common construction of an electric power steering system, a shaft 2 of a steering wheel 1 is connected to a tie rod 6 of steering vehicle wheels via universal joints 4a and 4b and a rack and pinion mechanism 5. A torque sensor 10 for detecting a steering torque in the steering wheel 1 is provided on the shaft 2, and a motor 20 for assisting a steering force of the steering wheel 1 is connected to the shaft 2 by way of a clutch 21 and reduction gears 3. To a control unit 30 for controlling the power steering system power is supplied from a battery 14 via an ignition key 11 and a relay 13, and the control unit 30 performs computation of a steering assist command value I of an assist command on the basis of a steering torque T detected by the torque sensor 10 and a vehicle speed V detected by a vehicle speed sensor 12 and controls a current supplied to the motor 20 on the basis of the computed steering assist command value I. The clutch 21 is ON/OFF-controlled by the control unit 30, and in a normal operating state is ON (engaged). When it has been determined by the control unit 30 that the power steering system has failed, and when due to the ignition key 11 or the relay 13 the power supply (voltage Vb) from the battery 14 is OFF, the clutch 21 is made OFF (disengaged).

The control unit 30 consists mainly of a CPU, and general functions executed by a program inside the CPU are shown in FIG. 2. For example a phase compensator 31 does not denote a phase compensator consisting of independent hardware, but rather denotes a phase compensation function executed by the CPU. Explaining the functions and operation of the control unit 30, the steering torque T detected by the torque sensor 10 and inputted is phase-compensated by the phase compensator 31 to raise the stability of the steering system, and a phase-compensated steering torque TA is inputted to a steering assist command value computing element 32. The vehicle speed V detected by the vehicle speed sensor 12 is also inputted to the steering assist command value computing element 32. The steering assist command value computing element 32 determines on the basis of the inputted steering torque TA and vehicle speed V a steering assist command value I, which is a control target value of the current supplied to the motor 20. The steering assist command value I is inputted to a subtractor 30A and is also inputted to a differential compensator 34 of a feedback system, the differential (I-i) of the subtractor 30A is inputted to a proportional computing element 35, and the proportional output thereof is inputted to an adder 30B and is also inputted to an integral computing element 36 for improving the characteristics of the feedback system. The outputs of the differential compensator 34 and the integral computing element 36 are also additively inputted to the adder 30B, and a current command value E, which is the addition result in the adder 30B, is inputted to a motor drive circuit 37 as a motor drive signal. The motor current value i of the motor 20 is detected by a motor current detecting circuit 38, and the motor current value i is fed back by being inputted to the subtractor 30A.

As described above, in the past a current command value has been computed on the basis of a torque signal (the steering torque T) and the current detected value i with one CPU, and the motor drive-controlled on the basis of that current command value. In this case, with respect to the determined motor current drive direction, by hard logic or another CPU a steering torque direction signal has been generated on the basis of the torque signal, and the motor has been driven only when this steering torque direction signal and the motor drive direction match. When detecting an abnormality of the motor drive system, the time from detecting to confirming the abnormality has been fixed and not correct always.

In the past the one CPU has been provided with an externally added WDT (Watch Dog Timer), and racing of the CPU has been monitored by clear pulses from the CPU being inputted to the WDT. If no clear pulse is inputted within a predetermined time, a reset signal has been outputted to the CPU from the WDT and the CPU has thereby been restarted. Also, in a system using two CPUs they have each outputted a pulse of a predetermined period to the other and monitored racing of the other CPU by mutually monitoring the period of the pulse.

In an electric power steering system of the kind described above, as the output of the motor increases the inertia of the motor increases, and to secure steering characteristics the need to compensate for the inertia of the motor has emerged. As a result of the control compensating for inertia, the direction according to the torque signal which has been carried out in the past and the direction in which the motor is actually driven have come to not match. Consequently, the problem has arisen that notwithstanding that the control containing the inertia compensation function is operating normally, due to another control part outputting a torque direction signal based on the torque signal, the motor drive has temporarily been stopped. That is, direction interlock based on the direction of the steering torque, which has been carried out in the past, is becoming unsuited to actual systems.

In the past, when detecting abnormality of the motor drive system, the time from detecting to confirming the abnormality has been fixed. However, when the difference between the current command value and the motor current detected value is obtained to detect abnormality, when there is a large difference it can be considered that there is clearly abnormality, and it is necessary to stop the system without delay. And, when the difference is small, because a misdetection caused by the influence of noise or the like is conceivable, it is necessary to take time to confirmation.

When racing of the CPU is monitored using an externally added WDT as in the past, when racing arises in the CPU due to the program not operating normally, it is restarted by a reset signal from the WDT. However, in the case of a failure of a kind such that the program causes racing again at a similar place, an outputting state and a stopped state of the motor occur alternately, and have created a dangerous state for the driver.

On the other hand, in a system having two control parts, when one control part performs control computation and the other control part monitors that, to check that the monitoring control part is operating normally it is necessary for the two control parts to monitor racing of the CPU mutually.

When in a system using two CPUs they send and receive pulse signals to each other to monitor racing of the CPUs, there have been cases wherein the program itself does not operate normally and only continues to output the monitoring pulse so that racing cannot be detected, or due to electromagnetic waves or noise a pulse signal being outputted normally is measured erroneously and a mis-detection is made.

SUMMARY OF THE INVENTION

The present invention was made on the basis of the kind of situation described above, and an object of the present invention is, particularly when controlling a motor with large inertia, to provide a control apparatus of an electric power steering system with improved control performance and safety having two digital control parts (CPUs or MCUs), a main and a sub, and carrying out control of power steering with one and mutually monitoring with the other control part.

The present invention relates to a control apparatus of an electric power steering system for, on the basis of a current command value computed from a current detected value of a motor and a steering assist command value computed on the basis of a steering torque arising in a steering shaft, controlling the motor, which applies a steering assist force to a steering mechanism, and the above-mentioned object of the present invention is achieved by there being provided a first control part and a second control part each inputting at least a torque signal, a vehicle speed signal, the motor current detected value and a motor terminal voltage, and the motor being controlled with the first control part and the second control part.

Also, the above-mentioned object of the present invention can be achieved by it having and controlling the motor with a first control part and a second control part each inputting at least a torque signal, a vehicle speed signal, the motor current detected value and a motor terminal voltage; both of the control parts having a function of estimating the motor angular speed; and the first control part and the second control part being connected by serial communication and each monitoring whether the other control part is racing by transmitting and receiving predetermined communication commands between themselves, and performing self-monitoring with WDTs built in to the MCUs.

DESCRIPTION OF THE PREFERRED EMBODIMENTS

In the present invention, two control parts comprising CPUs or MCUs are provided as a control apparatus of an electric power steering system; to each control part is inputted at least a torque signal, a vehicle speed signal, a motor current detected value and a motor terminal voltage; a motor is controlled with a motor current command value computed by the first control part; and on the basis of the difference between a motor current command value computed by the second control part and the motor current detected value it is determined whether or not the motor current command value computed by the first control part is normal. Or, the direction of the motor current command value computed by the second control part and a motor drive direction signal outputted from the first control part are compared, and it is thereby determined whether or not the motor current command value computed by the first control part is normal. And, WDTs for self-monitoring and monitoring the other are provided in each of the control parts, and racing of the control parts is detected by communication commands being transmitted and received mutually.

An embodiment of the present invention will now be described in detail with reference to drawings.

Figure 1:
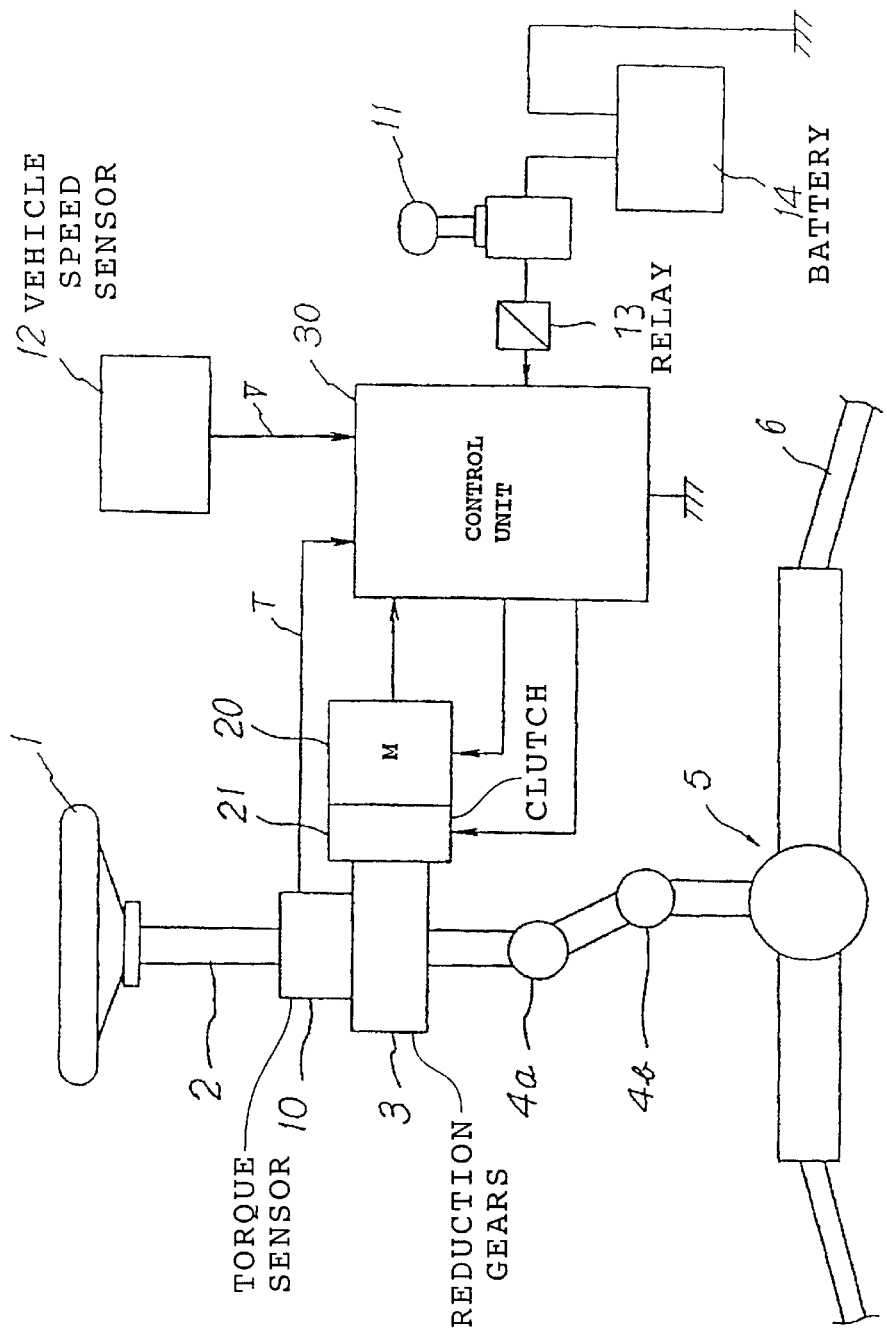
FIG. 1 is a structure view showing an outline construction of an electric power steering system.
Figure 2:
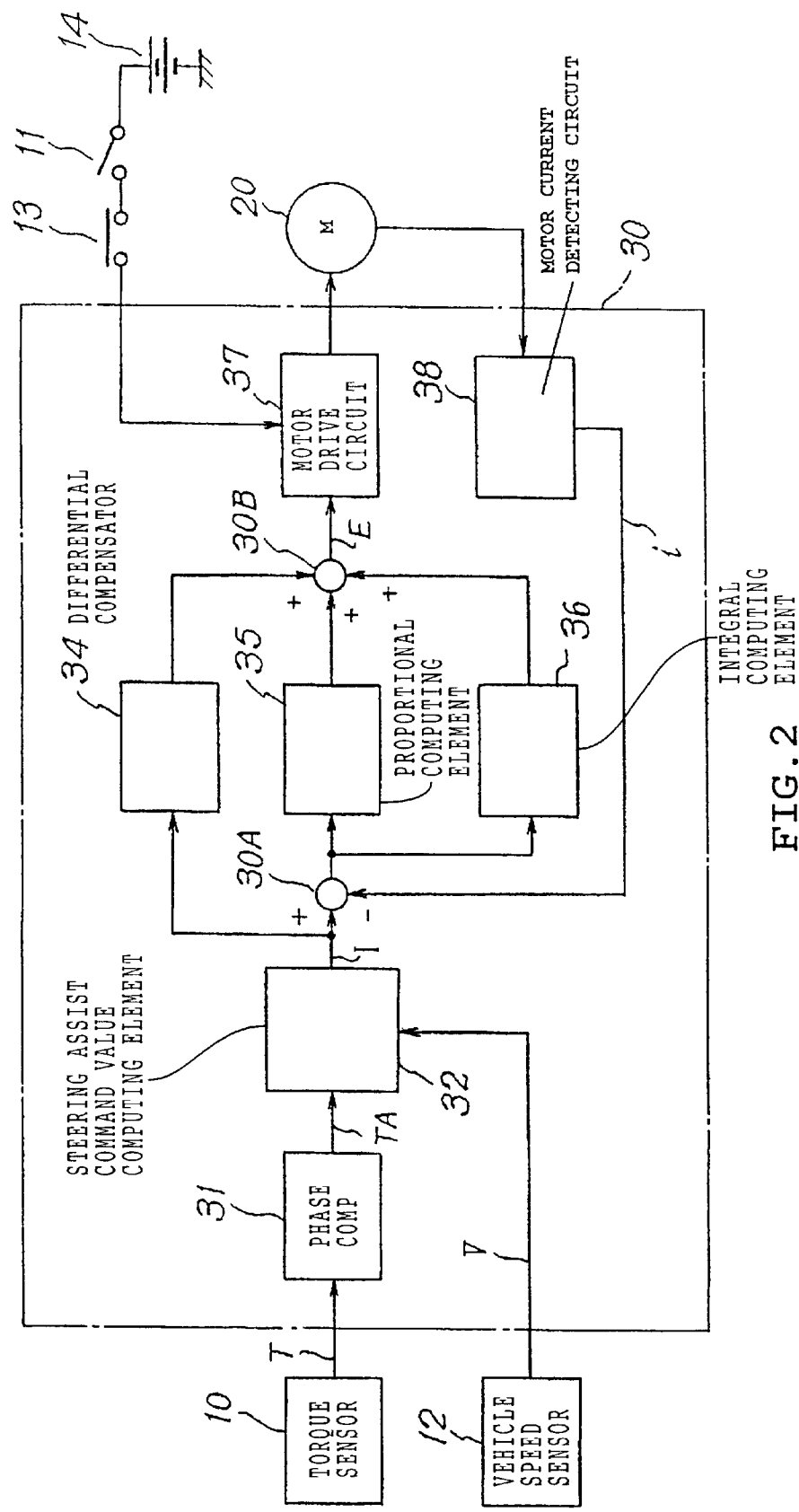
FIG. 2 is a block construction view showing an example of a control device of an electric power steering system.
Figure 3:
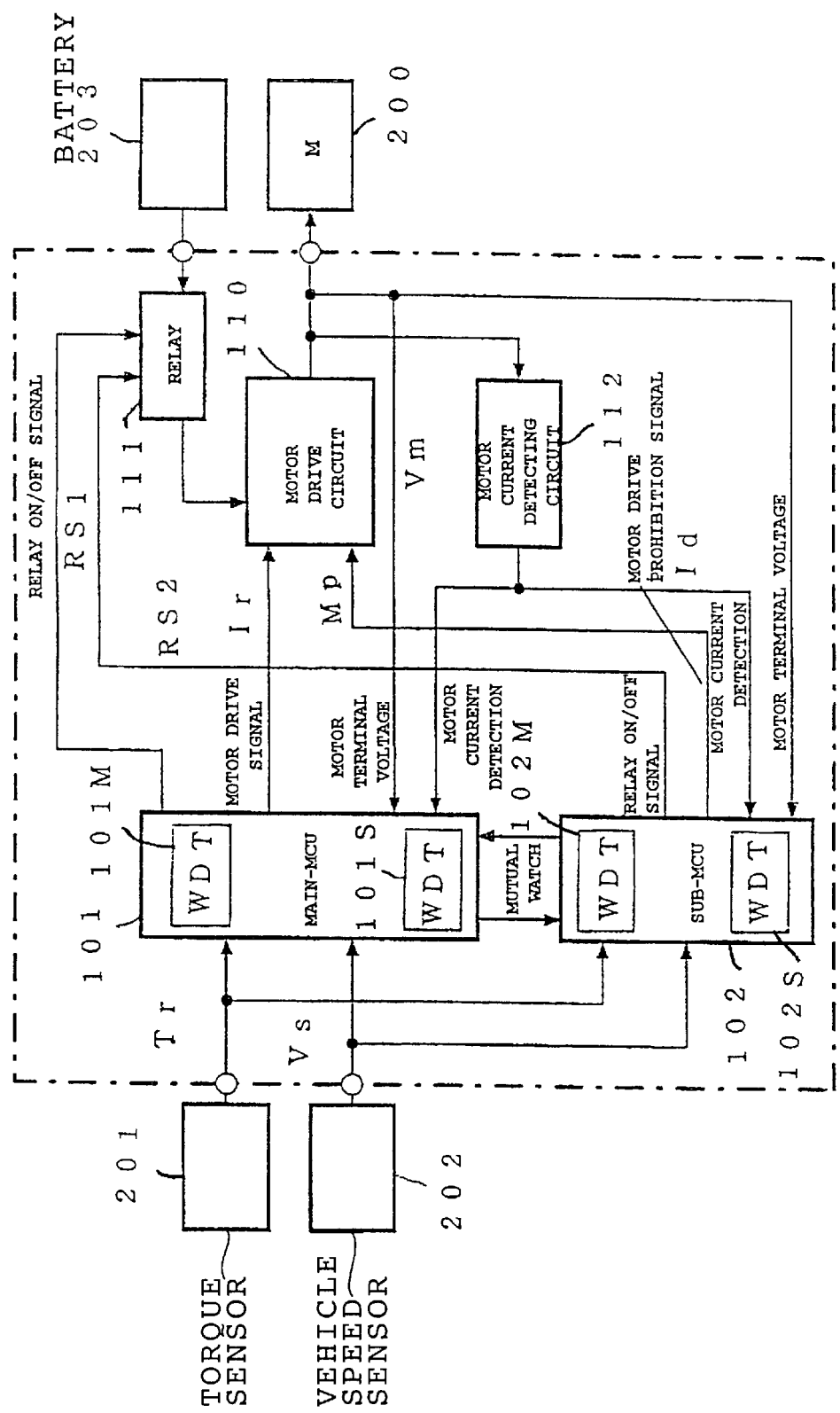
FIG. 3 is a block diagram showing the construction of an embodiment of the present invention.

FIG. 3 is a block diagram showing an embodiment of the present invention; a torque signal Tr from a torque sensor 201 and a vehicle speed signal Vs from a vehicle speed sensor 202 are inputted to a main MCU 101 and to a sub MCU 102, and a motor drive signal Ir computed by the main MCU 101 is inputted to a motor drive circuit 110 and on the basis of the motor drive signal Ir the motor drive circuit 110 drives a motor 200. The main MCU 101 incorporates for mutual monitoring a for-sub WDT 101S and a main MCU self-monitoring WDT 101M, and the sub MCU 102 also incorporates for mutual monitoring a for-main WDT 102M and a sub MCU self-monitoring WDT 102S.

A relay 111 for switching ON/OFF an input of a battery 203 is ON/OFF-controlled by a relay ON/OFF signal RS1 outputted from the main MCU 101 and a relay ON/OFF signal RS2 outputted from the sub MCU 102; the current of the motor 200 is detected by a motor current detecting circuit 112, a current detection value Id thereof is inputted to the main MCU 101 and to the sub MCU 102 together with a motor terminal voltage Vm, and a motor drive prohibiting signal Mp outputted from the sub MCU 102 is inputted to the motor drive circuit 110.

Figure 4:
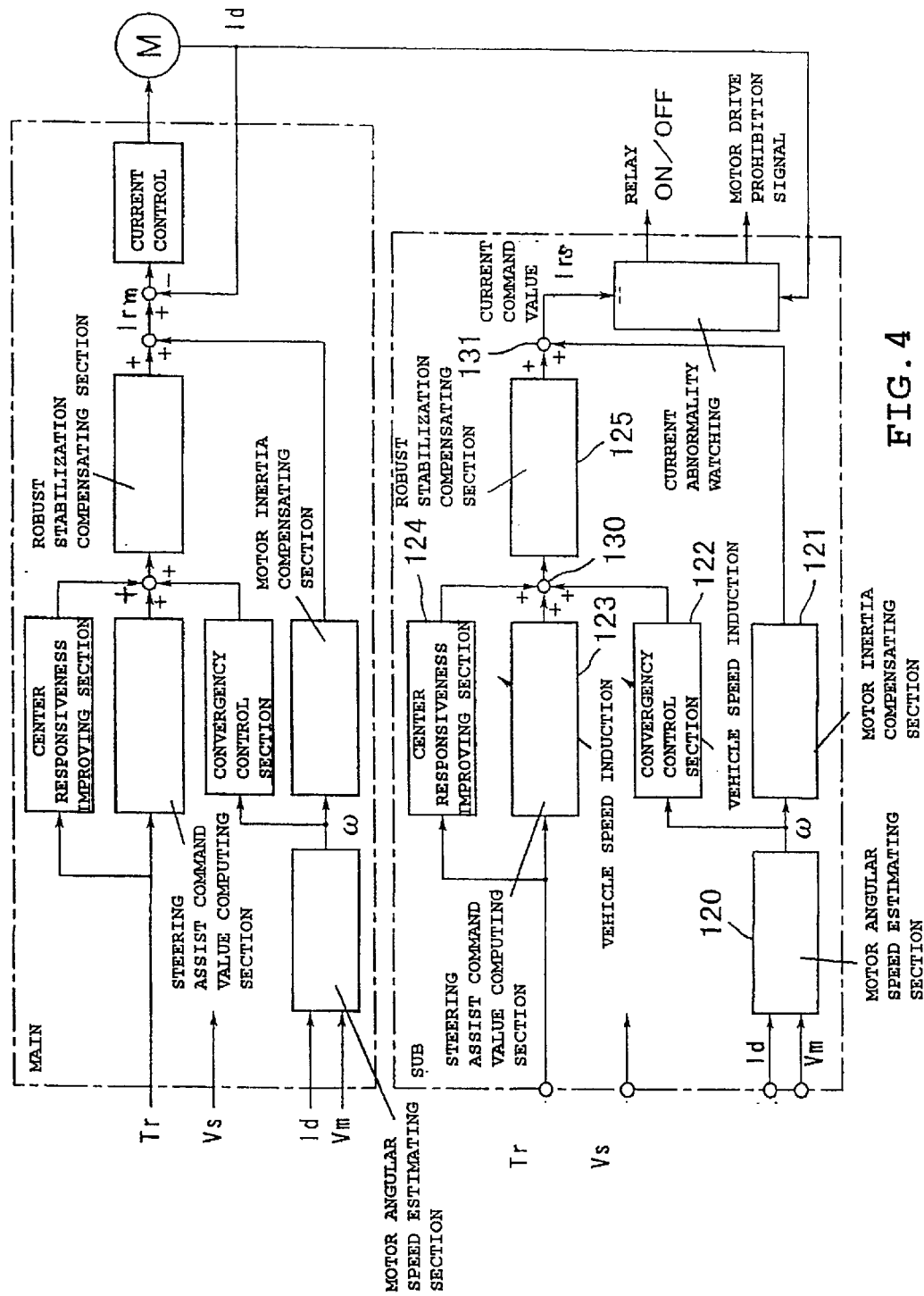
FIG. 4 is a block diagram showing a functional constitution example of a current command computing part in a control part of the present invention.

The main MCU 101 and the sub MCU 102 both generate a motor drive signal (current command value) Ir on the basis of the torque signal Tr, the vehicle speed signal Vs and the current detection value Id, but only the motor drive signal (current command value) Ir from the main MCU 101 is inputted to the motor drive circuit 110; the motor drive signal Ir computed by the sub MCU 102 is used for monitoring. The functional constitutions of the main MCU 101 and the sub MCU 102 are as shown in FIG. 4.

That is, each of the main MCU 101 and the sub MCU 102 computes a motor drive signal Ir on the basis of the torque signal Tr, the vehicle speed signal Vs, the current detection value Id and the motor terminal voltage Vm and is made up of a motor angular speed estimating section 120, a motor inertia compensating section 121, a convergency control section 122, a steering assist command value computing section 123, a center responsiveness improving section 124, a robust stabilization compensating section 125, and adders 130 and 131. The motor angular speed estimating section 120 computes a counter-electromotive voltage of the motor 200 from the current detection value Id and the motor terminal voltage Vm and estimates the motor angular speed ω from this counter-electromotive voltage. The estimated motor angular speed ω is inputted to the motor inertia compensating section 121 and the convergency control section 122, the output of the motor inertia compensating section 121 is inputted to the adder 131, and the output of the convergency control section 122 is inputted to the adder 130.

The steering assist command value computing section 123 calculates on the basis of the torque signal Tr a value to become a base of the motor drive signal Ir, the center responsiveness improving section 124 also calculates on the basis of the torque signal Tr a value to become a base of the motor drive signal Ir, and both of the calculated values are inputted to the adder 130. The summation value of the adder 130 is inputted to the robust stabilization compensating section 125, the output thereof is inputted to the adder 131, and the summation value of the adder 131 is the motor drive signal Ir.

The convergency control section 122 and the steering assist command value computing section 123 use the vehicle speed signal Vs as a parameter; the convergency control section 122 applies a brake to movement of the steering wheel swinging about to improve convergency of yaw of the vehicle, and the motor inertia compensating section 121 compensates for inertia and friction of the motor 200. The center responsiveness improving section 124 raises the responsiveness of control in the neutral vicinity of the steering, to realize smooth steering, and the robust stabilization compensating section 125 is a compensating section shown in Japanese Patent Application Laid-open (KOUKAI) No. 8-290778 and has a characteristic formula $G(s)=(s^2+a1 \cdot s+a2)/(s^2+b1 \cdot s+b2)$, in which s is a Laplace operator, an removes a peak value of a resonance frequency of a resonating system consisting of an inertia element and a spring element included in the detected torque, and compensates for phase slip of the resonance frequency, which impairs safety and responsiveness of the control system. The a1, a2, b1 and b2 of the characteristic formula G(s) are parameters determined in accordance with the resonance frequency of the resonating system.

The motor angular speed estimating part 120 may carry out angular speed estimation by the method shown in Japanese Patent Application Laid-open (KOUKAI) No. 10-109655, or may carry out the angular speed estimation set forth in Japanese Patent Application Laid-open (KOUKAI) No. 10-338152 of the present applicant. That is, by defining impedance models of the motor drive system differing between an intermittent mode and a continuous mode, the motor angular speed is estimated taking into account the influence that the drive mode extends over the drive system impedance. When $I_0$ is a current value at which it switches from the intermittent mode to the continuous mode, and $K_T \cdot \omega$ is the estimated value of the counter-electromotive voltage force, it is estimated by the following expressions (1) and (2).

When $I < I_0$ (1)
$K_T \cdot \omega = Vm - R1 \cdot i$ $I \geq I_0$ (2)
$K_T \cdot \omega = Vm - (R2 \cdot i + b)$ where R1 is the impedance of the intermittent mode at a standard temperature, R2 is the impedance of the continuous mode at a standard temperature, and b is a constant.

Figure 5:
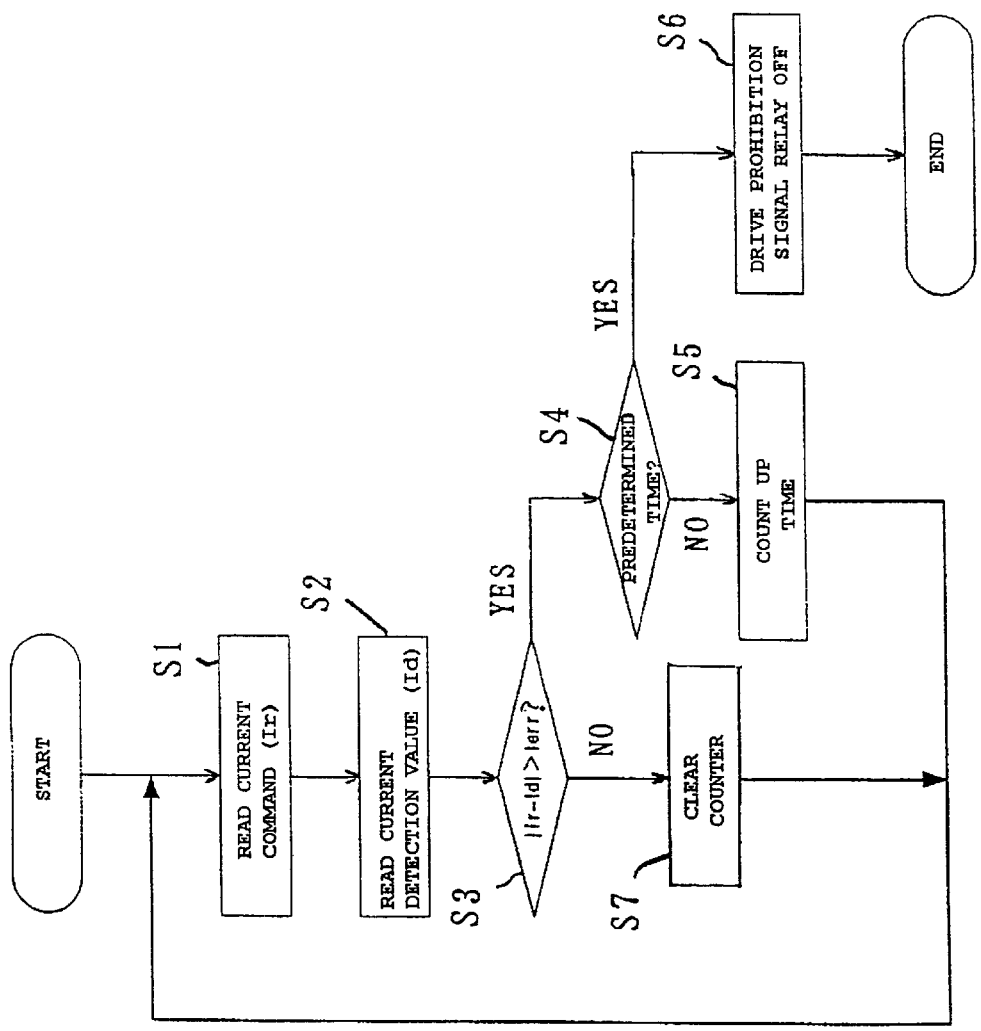
FIG. 5 is a flow chart showing an operation example of the present invention.

Current computation abnormality detection in this kind of construction will be explained with reference to the flow chart of FIG. 5. In the sub MCU 102, first, reading in of the current command value Irs computed by the sub MCU 102 is carried out (Step S1), and then reading in of the current detection value Id is carried out (Step S2), and it is determined whether or not the absolute value |Ir-Id| of the difference therebetween is larger than a predetermined value Ierr (Step S3). When the absolute value of that difference is equal to or lower than the predetermined value Ierr, a counter is cleared (Step S7) and processing returns to Step S1, and when the absolute value of the difference is larger than the predetermined value predetermined value Ierr, next it is determined whether or not a predetermined time has elapsed (Step S4).

When the predetermined time has not elapsed the elapsed time is counted up (Step S5) and processing returns to Step S1, and if the predetermined time has elapsed then the motor drive signal is prohibited and the motor 200 is stopped and the relay 111 is turned OFF (Step S6). That is, the sub MCU 102 inputs the motor drive prohibiting signal Mp to the motor drive circuit 110 and thereby stops driving of the motor 200, and inputs the relay ON/OFF signal RS2 to the relay 111 and thereby cuts off the relay 111.

Figure 6:
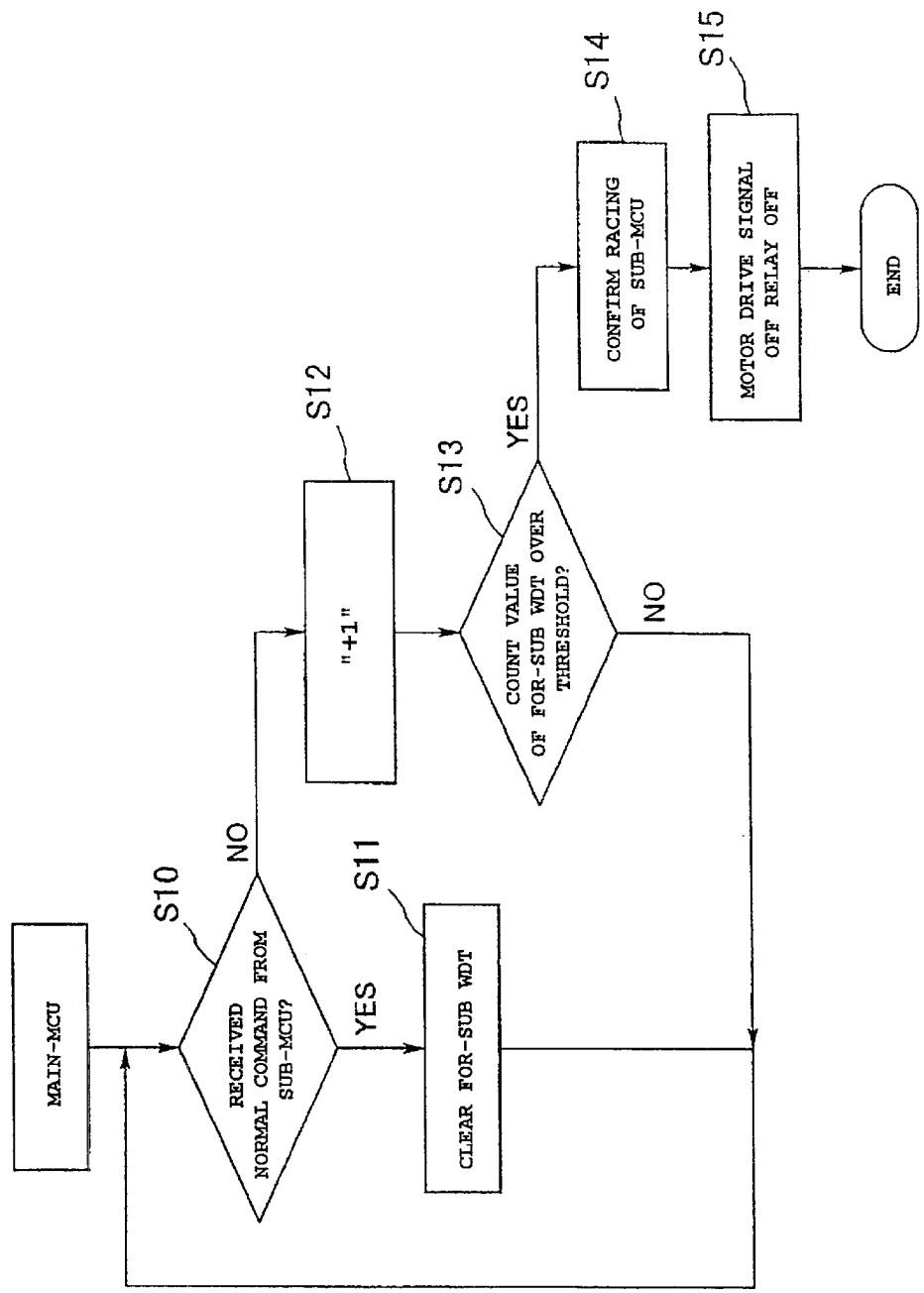
FIG. 6 is a flow chart showing an operation example of mutual monitoring of control parts in the present invention.

Meanwhile, between the main MCU 101 and the sub MCU 102, monitoring of operation (racing) is carried out mutually by serial communication, and an example of that operation will now be described with reference to the flow chart of FIG. 6. FIG. 6 shows the operation of the main MCU 101, but the operation of the sub MCU 102 is also the same.

The main MCU 101 constantly determines whether or not it has received a normal command from the sub MCU 102 (Step S10), and when it has received a normal command clears the built-in for-sub WDT 101S (Step S11) and returns to the standby state. When in Step S10 it determines that it has not received a normal command, it adds "+1" to the for-sub WDT 101S (Step S12), and determines whether or not a count value of the for-sub WDT 101S is above a predetermined threshold value (Step S13). If the count value is equal to or below the threshold value it returns to the standby state, and if the count value has risen above the threshold value it confirms racing of the sub MCU 102 (Step S14), and turns OFF the motor drive signal Ir and turns OFF the relay 111 with the relay ON/OFF signal RSI (Step S15). When it is confirmed that the sub MCU 102 is racing, not only is the motor drive signal Ir turned OFF but also the motor drive prohibiting signal Mp is outputted and the motor drive circuit 110 is stopped and by the relay ON/OFF signal RS2 the relay 111 is turned OFF. This is because the motor current command value Irs generated by the sub MCU 102 is for monitoring, and is not supplied to the motor drive circuit 110.

If the MCU racing detection times of the WDTs for self-monitoring are set to the same time, when the two MCUs race at substantially the same time, after restarting effected by the WDTs for self-monitoring the two control parts temporarily operate normally, and mutual monitoring does not function, and when similar racing of the program occurs again, there is a risk of restarting effected by the WDTs for self-monitoring being repeated. For this reason, in the present invention, by the racing detection time of the main MCU monitoring WDT and the racing detection time of the sub MCU monitoring WDT being made different, it is made possible for racing to be detected more certainly.

Figure 7:
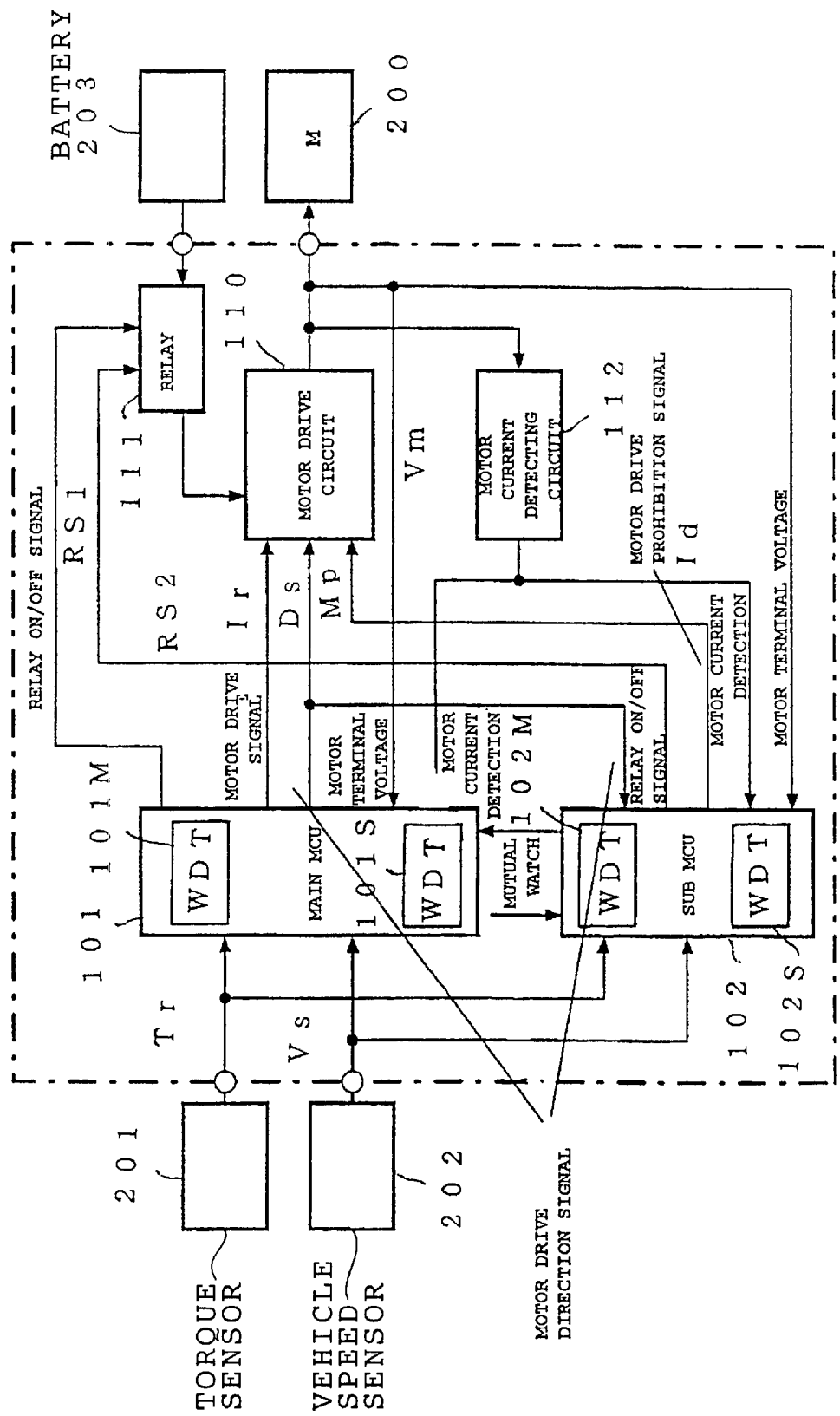
FIG. 7 is a block diagram showing the construction of another embodiment of the present invention.

FIG. 7 shows in correspondence with FIG. 3 another embodiment of the present invention, wherein the sub MCU 102 determines the motor drive direction of the current command value computed by itself and a motor drive direction signal Ds outputted by the main MCU 101 to the motor drive circuit 110 and by comparing the two directions determines whether the computation of the main MCU 101 has been performed normally. In other points it is exactly the same as the case of FIG. 3.

Figure 8:
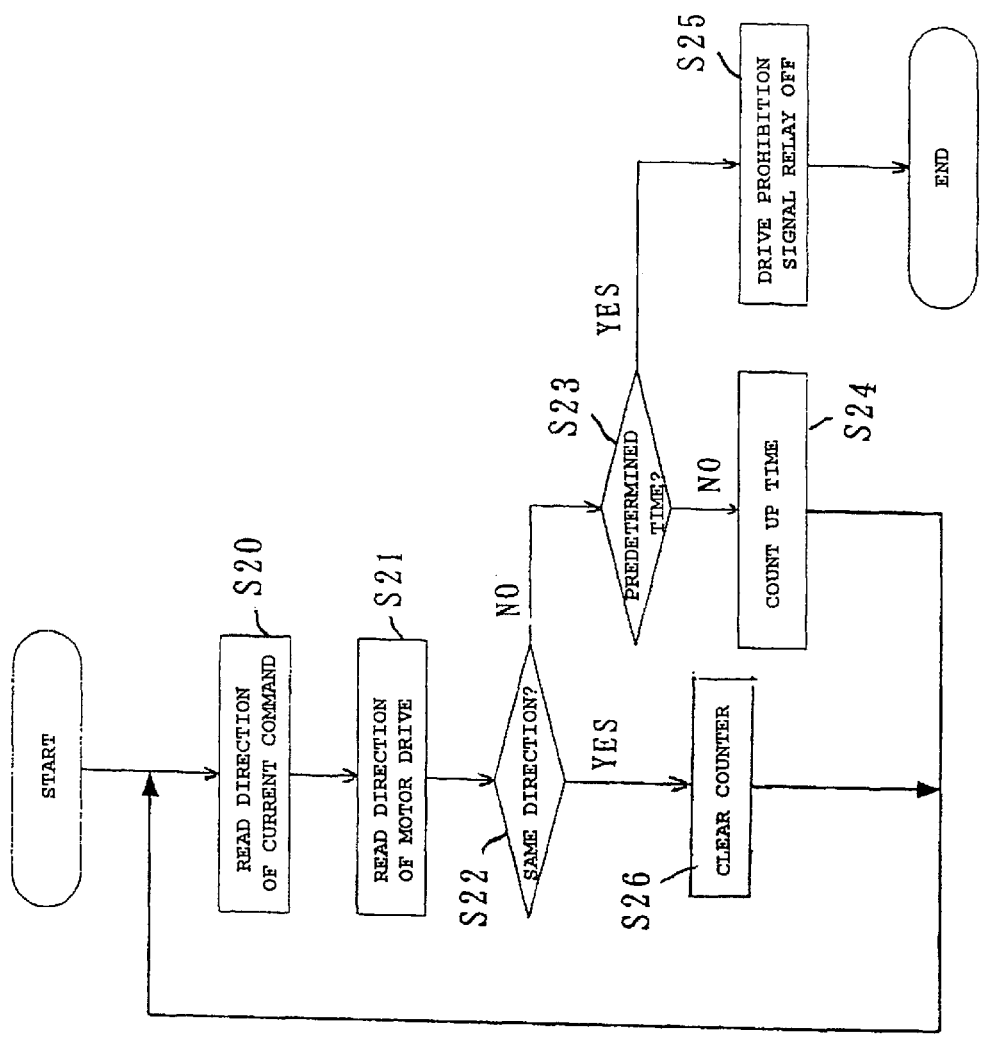
FIG. 8 is a flow chart showing an operation example of the present invention.

The operation of this construction will be explained with reference to the flow chart of FIG. 8. The sub MCU 102 first reads in the direction of the motor current command value Irs that it has computed itself (Step S20) and then reads in the motor drive direction signal Ds outputted from the main MCU 101 (Step S21), and determines whether or not the two directions are the same (Step S22). When the two directions are the same, because it is normal, it clears a counter (Step S26) and returns to Step S20 and repeats the foregoing operation. When the two directions are not the same, it is probably abnormality, but it is not decided immediately, and it is determined after a predetermined time (Step S23). If the predetermined time has not elapsed it is determined not to be abnormality, and the elapsed time is counted up by a counter (Step S24), and processing returns to Step S20. Further, when in Step S23 the predetermined time elapses then abnormality is confirmed and the motor drive prohibiting signal Mp is outputted and the motor drive circuit 110 is thereby stopped and the relay ON/OFF signal RS2 is outputted and the relay 111 is thereby turned OFF (Step S25).

Figure 9:
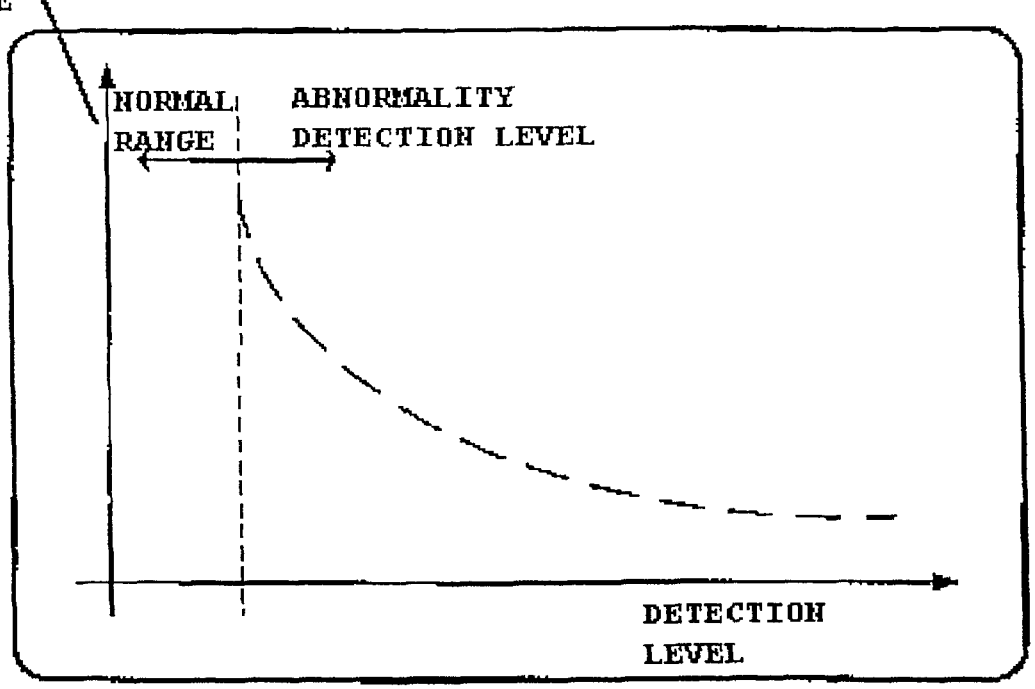
FIG. 9 is a view for explaining confirmation of abnormality in the invention.

In the present invention as described above even when abnormality is detected it is not deemed abnormality immediately and the abnormality is confirmed after the elapsing of a predetermined time and subsequent processing is carried out, but alternatively the relationship between the detection level and the abnormality confirmation time may be made to vary as shown in FIG. 9. That is, when the detection level is small, since the degree of the abnormality is likely to be light, the abnormality confirmation time is made long, and when the detection level is large, since the degree of the abnormality is likely to be heavy, the abnormality confirmation time is made short. In FIG. 8 it is varied on a two-dimensional curve, but it may alternatively be varied on a one-dimensional curve.

The present invention can not only of course be applied to column type and pinion type electric power steering systems but can also be applied to rack-assist type electric power steering systems. Although MCUs were described in the foregoing, it is exactly the same for CPUs In the present invention, because a control apparatus of an electric power steering system is constituted with two control parts (CPUs or MCUS), each of the control parts has a function of estimating the motor angular speed, with the first control part a current command value is generated and the motor is driven, with the second control part also the same computation is carried out, the current command value computed by the second control part and the current command value of the motor controlled by the first control part are compared, or also with respect to the rotation directions it is determined whether or not they are the same, and any abnormality is thereby detected, control characteristics and safety improve. Because in the present invention mutual monitoring based on serial communication between the two control parts is carried out, and self-monitoring with WDTs incorporated in the MCUs is carried out, it is possible to completely prevent accidents caused by racing of a CPU or the like.

What is claimed is:

1. A control apparatus of an electric power steering system for, on the basis of a current command value computed from a current detected value of a motor and a steering assist command value computed on the basis of a steering torque arising in a steering shaft, controlling the motor, which applies a steering assist force to a steering mechanism, which comprises:

a first control part and a second control part each inputting a torque signal, a vehicle speed signal, the motor current detected value and a motor terminal voltage, and the motor is controlled with the first control part and the second control part, wherein on the basis of the torque signal, the vehicle speed signal, the motor current detected value and the motor terminal voltage, the second control part computes a current command value and monitors the first control part, and the angular speed of the motor is estimated by the first control part and the second control part, and monitoring of out of control is carried out mutually by serial communication between the first control part and the second control part.

2. A control apparatus of an electric power steering system according to claim 1, wherein on the basis of the difference between the current command value computed by the second control part and the motor current detected value and it is determined whether or not the current command value computed by the first control part is normal and when current abnormality is detected at least one of a motor drive signal and a relay is cut off.

3. A control apparatus of an electric power steering system according to claim 2, wherein a time for confirming the current abnormality is variable according to a detection level.

4. A control apparatus of an electric power steering system according to claim 1, wherein the direction of the current command value computed by the second control part and a motor drive direction signal generated by the first control part are compared and it is determined whether or not the direction of the current command value computed by the first control part is normal and when direction abnormality is detected at least one of a motor drive signal and a relay is cut off.

5. A control apparatus of an electric power steering system for, on the basis of a current command value computed from a current detected value of a motor and a steering assist command value computed on the basis of a steering torque arising in a steering shaft, controlling the motor, which applies a steering assist force to a steering mechanism, comprises:

a first control part and a second control part each inputting a torque signal, a vehicle speed signal, the motor current detected value and a motor terminal voltage, and the first control part and the second control part are connected by serial communication and by transmitting and receiving predetermined communication commands between themselves each monitor whether the other control part is out of control, wherein the first control part and the second control part control the motor, and the first control part and the second control part monitor themselves with watch dog timers (WDTs) built in to each of them.

6. A control apparatus of an electric power steering system according to claim 5, wherein when racing of the other control part is detected at least one of a motor drive signal and a relay is cut off.

7. A control apparatus of an electric power steering system according to claim 5, wherein start times of control part racing detection of a built-in WDT of the first control part and a built-in WDT of the second control part are different.

* * * * *